(12) United States Patent
Varveropoulos et al.

(10) Patent No.: US 9,500,768 B2
(45) Date of Patent: Nov. 22, 2016

(54) WIRELESS TELEMETRY THROUGH DRILL PIPE

(75) Inventors: Vassilis Varveropoulos, Pennington, NJ (US); Reza Taherian, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1094 days.

(21) Appl. No.: 12/507,238

(22) Filed: Jul. 22, 2009

(65) Prior Publication Data
US 2011/0018734 A1    Jan. 27, 2011

(51) Int. Cl.
*G01V 3/00*    (2006.01)
*G01V 11/00*    (2006.01)

(52) U.S. Cl.
CPC .................................. *G01V 11/002* (2013.01)

(58) Field of Classification Search
CPC ....................................................... G01V 3/00
USPC ........................................... 340/853.1, 853.7
See application file for complete search history.

(56) References Cited

U.S. PATENT DOCUMENTS

| | | | |
|---|---|---|---|
| 3,309,656 A | | 3/1967 | Godbey |
| 4,823,125 A | * | 4/1989 | Rorden ............... E21B 17/1021 166/250.11 |
| 4,839,644 A | * | 6/1989 | Safinya ................. E21B 47/122 175/40 |
| 5,375,098 A | | 12/1994 | Malone et al. |
| 5,831,549 A | | 11/1998 | Gearhart |
| 6,636,253 B2 | | 10/2003 | Nishiguchi |
| 2002/0116129 A1 | * | 8/2002 | Alft ........................... E21B 7/04 702/9 |
| 2004/0012392 A1 | * | 1/2004 | McCormick ............. G01V 3/30 324/338 |
| 2004/0085077 A1 | * | 5/2004 | Nyfors .................... G01N 22/00 324/637 |
| 2005/0104176 A1 | * | 5/2005 | Rodney ............... E21B 47/0002 257/678 |
| 2006/0221768 A1 | * | 10/2006 | Hall ......................... G01V 1/40 367/82 |
| 2006/0250243 A1 | * | 11/2006 | Masino ................. E21B 47/124 340/572.1 |
| 2008/0007421 A1 | * | 1/2008 | Liu ....................... G01V 11/002 340/853.3 |
| 2008/0062036 A1 | * | 3/2008 | Funk ....................... E21B 29/06 342/22 |
| 2009/0184841 A1 | * | 7/2009 | Gardiner ............... E21B 47/122 340/853.1 |
| 2009/0289808 A1 | * | 11/2009 | Prammer .............. E21B 17/003 340/853.7 |
| 2010/0044035 A1 | * | 2/2010 | Bespalov ............ E21B 47/0905 166/255.1 |
| 2010/0133006 A1 | * | 6/2010 | Shakra .................... E21B 47/12 175/24 |

OTHER PUBLICATIONS

R.E.Collins, "Foundation of Microwave Engineering," McGraw-Hill Book Co., pp. 107-113 (1966).

* cited by examiner

*Primary Examiner* — Amine Benlagsir
(74) *Attorney, Agent, or Firm* — Stephanie Chi

(57) ABSTRACT

The present disclosure relates to a telemetry tool for use in a well. The telemetry tool has a hollow, conductive waveguide through which a non-conductive fluid can flow. A transmitter and a receiver are disposed in the hollow interior of the waveguide, separated by some desired distance. A signal is transmitted by the transmitter, propagated by the waveguide, and received by the receiver.

15 Claims, 4 Drawing Sheets

WIRELESS TELEMETRY THROUGH DRILL PIPE

CROSS-REFERENCE TO OTHER APPLICATIONS

Not applicable.

BACKGROUND

Technical Field

The present disclosure relates to wellbore communication systems and particularly to wireless systems and methods for generating and transmitting data signals between the surface of the earth and a bottom hole assembly.

Background Art

Wells are generally drilled into the ground to recover natural deposits of hydrocarbons and other desirable materials trapped in geological formations in the Earth's crust. A well is typically drilled using a drill bit attached to the lower end of a drill string. The well is drilled so that it penetrates the subsurface formations containing the trapped materials and the materials can be recovered.

At the bottom end of the drill string is a "bottom hole assembly" ("BHA"). The BHA includes the drill bit along with sensors, control mechanisms, and the required circuitry. A typical BHA includes sensors that measure various properties of the formation and of the fluid that is contained in the formation. A BHA may also include sensors that measure the BHA's orientation and position.

The drilling operations may be controlled by an operator at the surface or operators at a remote operations support center. The drill string is rotated at a desired rate by a rotary table, or top drive, at the surface, and the operator controls the weight-on-bit and other operating parameters of the drilling process.

Another aspect of drilling and well control relates to the drilling fluid, called "mud". The mud is a fluid that is pumped from the surface to the drill bit by way of the drill string. The mud serves to cool and lubricate the drill bit, and it carries the drill cuttings back to the surface. The density of the mud is carefully controlled to maintain the hydrostatic pressure in the borehole at desired levels.

In order for the operator to be aware of the measurements made by the sensors in the BHA, and for the operator to be able to control the direction of the drill bit, communication between the operator at the surface and the BHA is necessary. A "downlink" is a communication from the surface to the BHA. Based on the data collected by the sensors in the BHA, an operator may desire to send a command to the BHA. A common command is an instruction for the BHA to change the direction of drilling.

Likewise, an "uplink" is a communication from the BHA to the surface. An uplink is typically a transmission of the data collected by the sensors in the BHA. For example, it is often important for an operator to know the BHA orientation. Thus, the orientation data collected by sensors in the BHA is often transmitted to the surface. Uplink communications are also used to confirm that a downlink command was correctly understood.

One common method of communication is called "mud pulse telemetry." Mud pulse telemetry is a method of sending signals, either downlinks or uplinks, by creating pressure and/or flow rate pulses in the mud. These pulses may be detected by sensors at the receiving location. For example, in a downlink operation, a change in the pressure or the flow rate of the mud being pumped down the drill string may be detected by a sensor in the BHA. The pattern of the pulses, such as the frequency, the phase, and the amplitude, may be detected by the sensors and interpreted so that the command may be understood by the BHA.

Mud pulse telemetry systems are typically classified as one of two species depending upon the type of pressure pulse generator used, although "hybrid" systems have been disclosed. The first species uses a valving "poppet" system to generate a series of either positive or negative, and essentially discrete, pressure pulses which are digital representations of transmitted data. The second species, an example of which is disclosed in U.S. Pat. No. 3,309,656, comprises a rotary valve or "mud siren" pressure pulse generator which repeatedly interrupts the flow of the drilling fluid, and thus causes varying pressure waves to be generated in the drilling fluid at a carrier frequency that is proportional to the rate of interruption. Downhole sensor response data is transmitted to the surface of the earth by modulating the acoustic carrier frequency. A related design is that of the oscillating valve, as disclosed in U.S. Pat. No. 6,626,253, wherein the rotor oscillates relative to the stator, changing directions every 180 degrees, repeatedly interrupting the flow of the drilling fluid and causing varying pressure waves to be generated.

With reference to FIG. 1, a drilling rig 10 includes a drive mechanism 12 to provide a driving torque to a drill string 14. The lower end of the drill string 14 extends into a wellbore 30 and carries a drill bit 16 to drill an underground formation 18. During drilling operations, drilling mud 20 is drawn from a mud pit 22 on a surface 29 via one or more pumps 24 (e.g., reciprocating pumps). The drilling mud 20 is circulated through a mud line 26 down through the drill string 14, through the drill bit 16, and back to the surface 29 via an annulus 28 between the drill string 14 and the wall of the wellbore 30. Upon reaching the surface 29, the drilling mud 20 is discharged through a line 32 into the mud pit 22 so that rock and/or other well debris carried in the mud can settle to the bottom of the mud pit 22 before the drilling mud 20 is recirculated.

Still referring to FIG. 1, one known wellbore telemetry system 100 is depicted including a downhole measurement while drilling (MWD) tool 34 incorporated in the drill string 14 near the drill bit 16 for the acquisition and transmission of downhole data or information. The MWD tool 34 includes an electronic sensor package 36 and a mudflow wellbore telemetry device 38. The mudflow telemetry device 38 can selectively block the passage of the mud 20 through the drill string 14 to cause pressure changes in the mud line 26. In other words, the wellbore telemetry device 38 can be used to modulate the pressure in the mud 20 to transmit data from the sensor package 36 to the surface 29. Modulated changes in pressure are detected by a pressure transducer 40 and a pump piston sensor 42, both of which are coupled to a surface system processor (not shown). The surface system processor interprets the modulated changes in pressure to reconstruct the data collected and sent by the sensor package 36. The modulation and demodulation of a pressure wave are described in detail in commonly assigned U.S. Pat. No. 5,375,098, which is incorporated by reference herein in its entirety.

The surface system processor may be implemented using any desired combination of hardware and/or software. For example, a personal computer platform, workstation platform, etc. may store on a computer readable medium (e.g., a magnetic or optical hard disk, random access memory, etc.) and execute one or more software routines, programs, machine readable code or instructions, etc. to perform the operations described herein. Additionally or alternatively, the surface system processor may use dedicated hardware or logic such as, for example, application specific integrated circuits, configured programmable logic controllers, discrete logic, analog circuitry, passive electrical components, etc. to perform the functions or operations described herein.

Still further, while the surface system processor can be positioned relatively proximate to the drilling rig (i.e., substantially co-located with the drilling rig), some part of or the entire surface system processor may alternatively be located relatively remotely from the rig. For example, the surface system processor may be operationally and/or communicatively coupled to the wellbore telemetry component 18 via any combination of one or more wireless or hardwired communication links (not shown). Such communication links may include communications via a packet switched network (e.g., the Internet), hardwired telephone lines, cellular communication links and/or other radio frequency based communication links, etc. using any desired communication protocol.

Additionally one or more of the components of the BHA may include one or more processors or processing units (e.g., a microprocessor, an application specific integrated circuit, etc.) to manipulate and/or analyze data collected by the components at a downhole location rather than at the surface.

In oil well drilling and logging, telemetry from downhole tools to the surface is an active area of technological development. As more sophisticated measurements are made by logging while drilling and measure while drilling tools, more data is generated and there is an increasing demand for a higher rate of data transfer from the downhole tools to the surface. In addition, the industry trend has been to develop new downhole measurements using new physical concepts so that in recent decades more and more tools are present as part of the bottom hole assembly (BHA). Meanwhile, the telemetry methods have improved at a slower pace and have not kept up with this increased demand in data transfer rate.

U.S. Pat. No. 5,831,549 discloses an air filled tube suspended inside a drill collar and used as a waveguide for telemetry. This invention requires the waveguide be air filled, which except for rare occasions is not the case for oil well drilling.

Although more recent developments in the field of wired drill pipe are promising technologies that will come to market in near future, there is a need for simple and less capital-intensive technology for fast telemetry.

SUMMARY

The present disclosure relates to a wireless telemetry tool for use in a well. The telemetry tool has a hollow, conductive waveguide through which a non-conductive fluid can flow. A transmitter and a receiver are disposed in the hollow interior of the waveguide, separated by some desired distance. A signal is transmitted by the transmitter, propagated by the waveguide, and received by the receiver.

Other aspects and advantages of the invention will become apparent from the following description and the attached claims.

BRIEF DESCRIPTION OF THE FIGURES

So that the above recited features and advantages of the present disclosure can be understood in detail, a more particular description, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

It is to be understood that the drawings are to be used for the purpose of illustration only, and not as a definition of the metes and bounds of the invention, the scope of which is to be determined only by the scope of the appended claims.

DETAILED DESCRIPTION

Specific embodiments of the invention will now be described with reference to the figures. Like elements in the various figures will be referenced with like numbers for consistency. In the following description, numerous details are set forth to provide an understanding of the present disclosure. However, it will be understood by those skilled in the art that the present invention may be practiced without these details and that numerous variations or modifications from the described embodiments are possible.

The following terms have a specialized meaning in this disclosure. While many are consistent with the meanings that would be attributed to them by a person having ordinary skill in the art, the meanings are also specified here.

In this disclosure, "fluid communication" is intended to mean connected in such a way that a fluid in one of the components may travel to the other. For example, a bypass line may be in fluid communication with a standpipe by connecting the bypass line directly to the standpipe. "Fluid communication" may also include situations where there is another component disposed between the components that are in fluid communication. For example, a valve, a hose, or some other piece of equipment used in the production of oil and gas may be disposed between the standpipe and the bypass line. The standpipe and the bypass line may still be in fluid communication so long as fluid may pass from one, through the interposing component or components, to the other.

A "drilling system" typically includes a drill string, a BHA with sensors, and a drill bit located at the bottom of the BHA. Mud that flows to the drilling system must return through the annulus between the drill string and the borehole wall. In the art, a "drilling system" may be known to include the rig, the rotary table, and other drilling equipment, but in this disclosure it is intended to refer to those components that come into contact with the drilling fluid.

Use of a cylindrical waveguide for transmitting an electromagnetic wave between two points is an established method at microwave frequencies. In oil well drilling, the drill pipe can act as a cylindrical waveguide transmitting a microwave signal between uphole and downhole electronics. Once the transmission is established, standard modulation techniques may be used to communicate data between uphole and downhole destinations in an oil well. The communication is two-way and, since the frequency is in the gigahertz (GHz) range, the baud rate can be very high.

Figure 1:
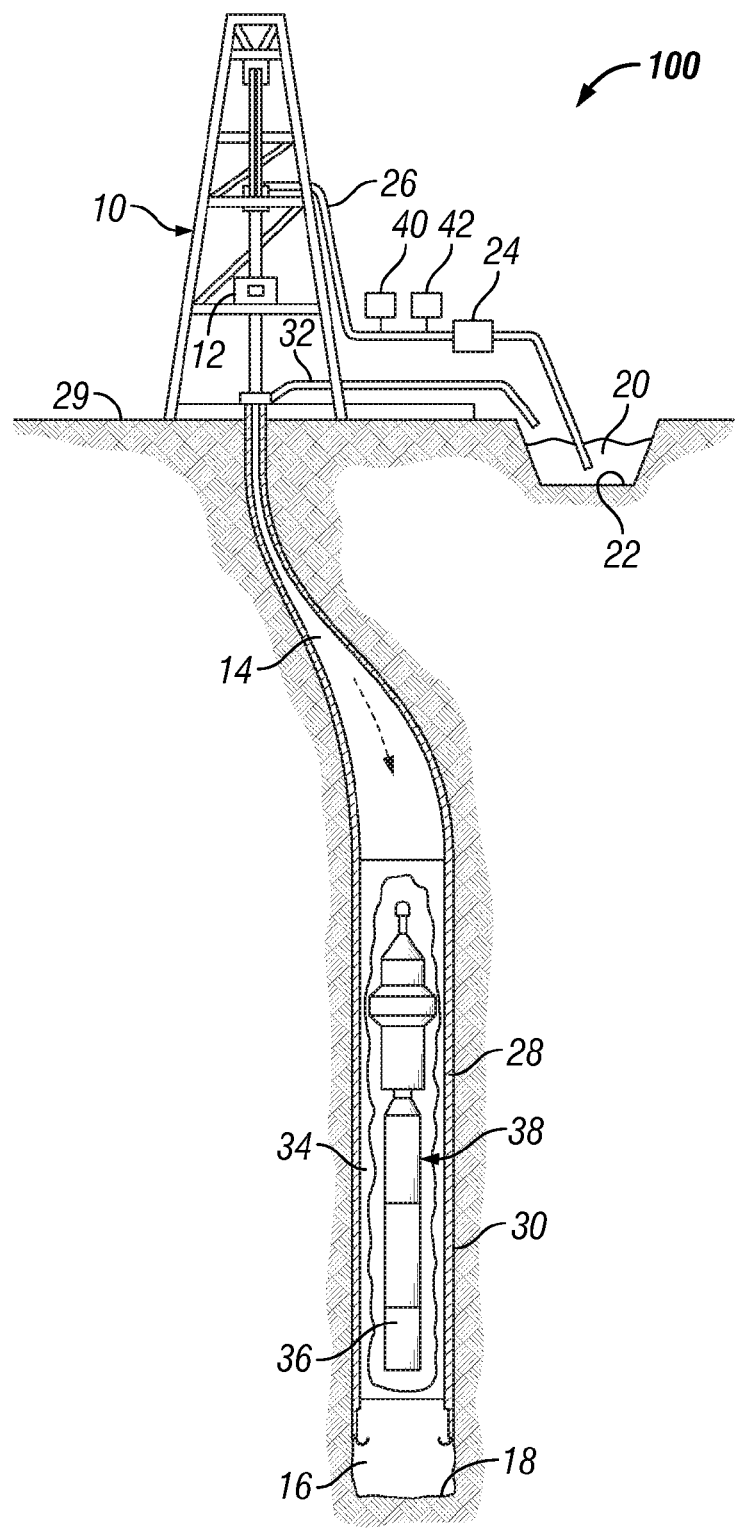
FIG. 1 is a schematic view, partially in cross-section, of a known measurement while drilling tool and wellbore telemetry device connected to a drill string and deployed from a rig into a wellbore.
Figure 2:
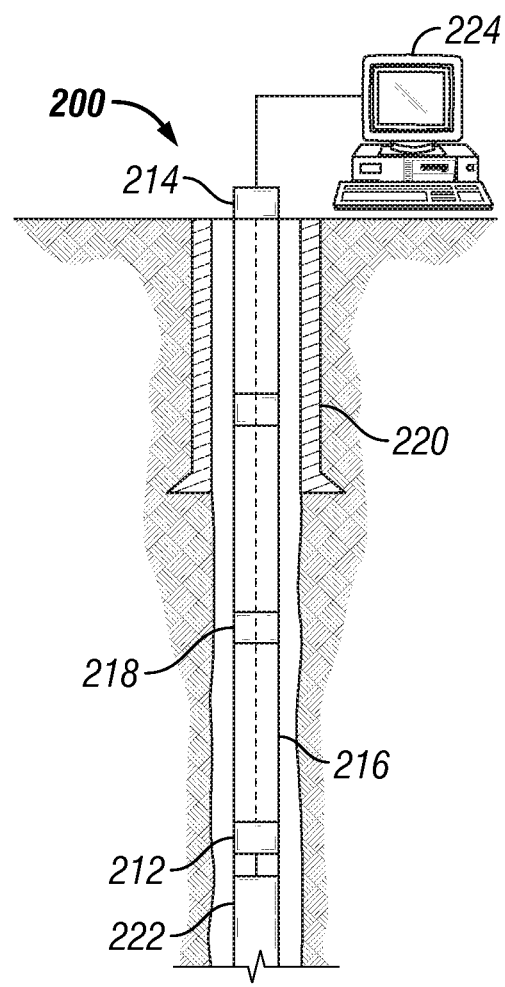
FIG. 2 is a schematic drawing of a telemetry tool, constructed in accordance with the present disclosure.

FIG. 2 shows a telemetry tool 200 that includes a downhole wireless interface 212 and an uphole wireless interface 214. Both interfaces are disposed in a conductive waveguide 216, which in this case is one or more stands of drill pipe. Repeaters 218 may be used and are shown within the interior of the drill pipe 216. Casing 220 and a bottom hole assembly 222 may be present and both are also shown. A computer or microprocessor system 224 is also shown.

In the following sections we discuss the wave propagation and show experimental results verifying the possibility of using drill pipe for data transmission. In the field of electromagnetism, cylindrical waveguides are routinely used for wave propagation. Cylindrical waveguides, particularly those with circular cross sections, guide and propagate the waves for relatively large distances with minimum attenuation per unit length. For GHz and MHz (megahertz) frequencies, the waveguide are preferably made of conductive materials, typically metals.

Solution of the wave propagation equations in these structures and imposition of appropriate boundary conditions leads to propagation modes and their cut off frequencies (see for example, R. E. Collin, Foundation of Microwave Engineering, McGraw-Hill Book Company, 1966, pp 107-113). The wave propagates in $TE_{nm}$, transverse electric, and $TM_{nm}$, transverse magnetic, modes. The TE modes have no electric field components in the direction of propagation, $e_z=0$, while the TM modes have no magnetic field component in the propagation direction, $h_z=0$. These modes have well defined magnetic and electric field patterns and are characterized by two indices, m and n. The cut off frequency, $f_c$, is an important geometrical parameter. Above the cut off frequency for a mode, the wave propagates rather efficiently, with minimal attenuation. At frequencies, below the cut off frequency for the mode, the field intensity attenuates exponentially with propagation distance.

The mode with smallest cut off frequency is the dominant mode. For circular (i.e., right circular cylinder) waveguides, this is the $TE_{11}$ mode. The cut off frequency for each TE mode, $f_{c,nm}$, can be calculated using the following relation, $$f_{c,nm} = \frac{C p'_{nm}}{2\pi a}$$

where C is the speed of light and a is the inner radius of the circular waveguide. In addition, $p'_{nm}$ is the $m^{th}$ root of the equation, $$\frac{d}{dr} J_n(k_c r) = 0$$

where $J_n(k_c r)$ is the Bessel function of the first kind and $n^{th}$ order, and $k_c$ is given by, $$k_c = \frac{2\pi f_c}{C}.$$

Thus given $p'_{nm}$ and the waveguide inner radius, the cut off frequency is easily calculated.

For the dominant mode, $TE_{11}$, of interest here, $p'_{nm}=1.841$, leading to $$f_{c,11} = \frac{87.9}{a},$$

where the frequency is in MHz and a is in meters. This expression is derived assuming the guide is under vacuum (or air filled) for which the dielectric permittivity, $e_0$, is $8.854(10^{-12})$ farad/m, and the magnetic permeability, $m_0$, is $4p(10^{-7})$ henry/m. When the guide is filled with material with relative dielectric permittivity e and relative magnetic permittivity m, the cut off frequency is given by $$f_{c,11} = \frac{87.9}{a\sqrt{\varepsilon\mu}}.$$

Most fluids of interest are non-magnetic and the relative magnetic permeability of a non-magnetic material is equal to one. The relative dielectric permittivity of free space is one, while that of oil, for example, is 2.2. For conductive fluids, the relative permittivity is complex and is given by $$\varepsilon^* = \varepsilon + \frac{i2\pi f \sigma}{\varepsilon_0}$$

where, i is the imaginary number and s is the fluid conductivity.

Before applying these relations to drill pipes, it is useful to have a short discussion on the detailed structure of drill pipes, specifically the inner diameter of those pipes. Drill pipes are usually 30 ft (+ or −1.5 ft) long pipes made of carbon steel. The standard five inch pipe, for example, has dimensions that are depicted in FIG. 3.

Figure 3:
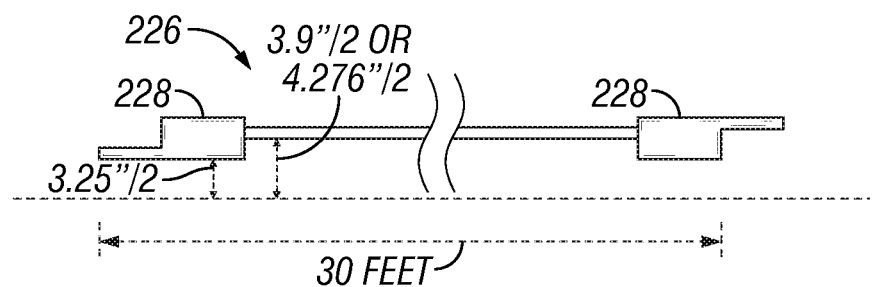
FIG. 3 is a schematic drawing of a section of drill pipe that may be used as part of the telemetry tool of FIG. 2.

As FIG. 3 shows, the pipe 226 has connection ends 228 that reduce the inner diameter (ID) to 3.25" while the bulk of the pipe 226 has an inner diameter of 3.9" for 19.5 lbs/ft pipe or 4.276" for 23.5 lbs/ft pipe. These dimensions are the critical dimensions for the purpose of calculating the cut off frequency for different modes. The following table shows exemplary results.

TABLE 1

| Internal Diameter (in) | Internal Radius (m) | $TE_{11}$ Cutoff Frequency (GHz) |
|---|---|---|
| 3.25 | 0.041 | 1.436 |
| 3.9 | 0.0495 | 1.196 |
| 4.276 | 0.054 | 1.091 |

The results in the above table are for pipes filled with OBM, which is assumed to have the same relative permittivity as oil (2.2) and no conductivity. The results indicate any section of the drill pipe can support a $TE_{11}$ wave propagation as long as the frequency is above about 1.4 GHz.

As the wave propagates along the guide, say in the z direction, there are losses due to the finite resistivity of the metal wall and the material filling the guide. If $P_0$ is the power at z=0, then the power, P(z), at any point along the z axis is given by $$P(z) = P_0 e^{-2\alpha z}$$

where a is the attenuation constant, which for TE modes in a cylindrical waveguide is given by $$\alpha_{nm} = \frac{R_m}{aZ_0}\left[\frac{f_{c,nm}^2}{f^2} + \frac{n^2}{(p'_{nm})^2 - n^2}\right]\frac{f}{\sqrt{f^2 - f_{c,nm}^2}}$$

Here $Z_0$ is the intrinsic impedance of free space given by $$Z_0 = \sqrt{\frac{\mu_0}{\varepsilon_0}} \approx 120\pi$$

and $R_m$ is the resistive part of the wall material, $$R_m = \sqrt{\frac{2\pi f \mu_0}{2\sigma}}.$$

For the dominant $TE_{11}$ mode, the expression for the attenuation constant reduces to $$\alpha_{11} = \frac{R_m}{aZ_0}\left[\frac{f_{c,nm}^2}{f^2} + 1.189\right]\frac{f}{\sqrt{f^2 - f_{c,11}^2}}.$$

This equation has a singularity when the operating frequency is equal to the cut off frequency. The frequency dependence of $a_{11}$ can be best demonstrated by noting that the operating frequency can always be expressed as a multiple p of the cut off frequency. Then, $$\alpha_{11}(pf_{c,11}) = \frac{R_m}{aZ_0}\left[\frac{1}{p^2} + 1.185\right]\sqrt{\frac{p^2}{p^2 - 1}}$$

Figure 4:
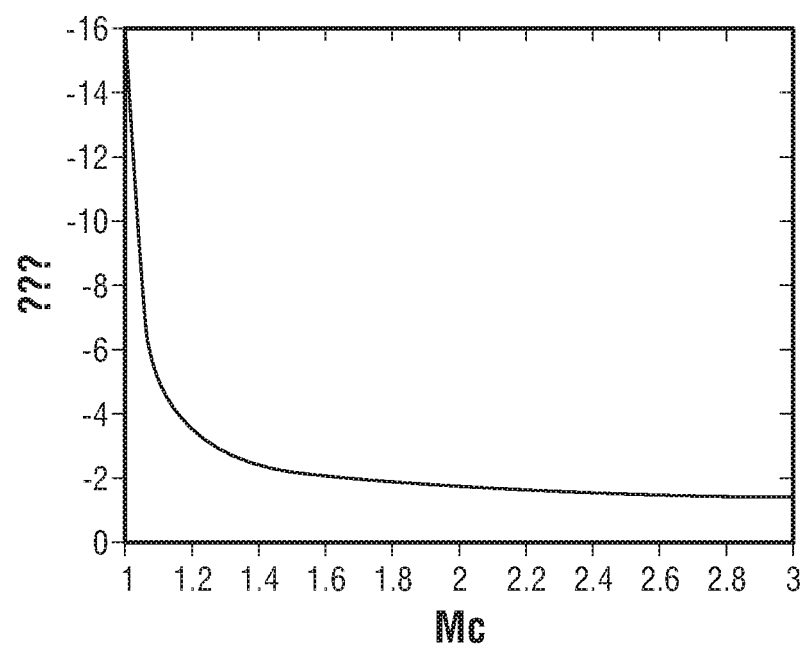
FIG. 4 is a graph showing how the attenuation constant behaves as a function of frequency.

FIG. 4 is a plot of $a_{11}$ in units of $R_m/aZ_0$. As the figure shows, at first the attenuation constant decreases quickly with frequency, but it levels off after about 1.2 times the cut off frequency.

To test the feasibility of using drill pipe as a waveguide, an experiment was performed. Commercial, off-the-shelf, wireless transceivers were used in this experiment. The transceivers were small enough to fit inside the drill pipe and were powered by a standard 9V battery. Due to a lack of pressure-tight packaging, the test was run inside an air filled drill pipe. This was achieved by using a drill bit with a plugged nozzle. One of the transceivers was placed directly above the drill bit, near the lower end of the first drill pipe. One stand of pipe (90 ft) was joined above that, and the whole assembly was placed below the rotary table. A second transceiver was placed near the upper end of the stand of pipe, in a portion that was about three ft from the rotary table. The transceivers were configured to continually "ping" one another. A laptop was connected to the upper (surface) transceiver and was used to monitor the communication quality. Three parameters were measured: (1) total packets sent; (2) total timeouts; and (3) the Receiver Signal Strength Indicator (RSSI). The RSSI measurement provides an estimate of the received signal strength. After the surface transceiver was placed in the drill pipe, the top was sealed with aluminum foil.

The transceiver modules used had the following specifications: Carrier Frequency: 2.4 GHz; Power Output: 60 mW (18 dBm); Receiver Sensitivity: −100 dBm; Data Rate: 250 Kbps; Modulation: QPSK, DSSS; and Antenna Type: ¼ wavelength wire (~2 dBi).

Figure 5:
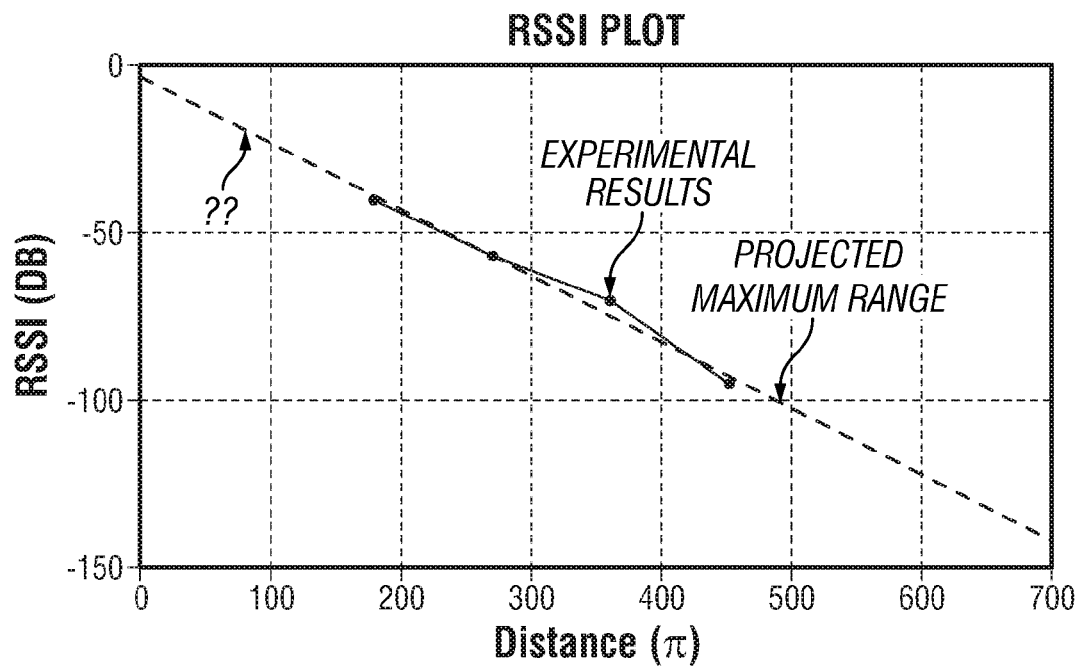
FIG. 5 is a graph showing how the receiver signal strength behaves as a function of distance.

The total power budget was estimated to be 120 dB (power output−receiver sensitivity+antenna gain). FIG. 5 shows the measured and projected signal strength. Communication was successful up to the fifth stand of pipe (450 ft) with no errors. However, communication errors did occur when the sixth stand of pipe was added (540 ft). As expected, the attenuation is very close to being linear and therefore, by interpolating the data points, the projected maximum range will be about 500 ft (this is where the RSSI reaches the receiver sensitivity of −100 dBm).

Given a power budget of 120 dB and a maximum measured range of 500 ft, attenuation is found to be 0.24 dB/ft. That is higher than theoretically expected, and is attributed to the internal surface roughness of the drill pipes. The drill pipes used were not specially selected for having smooth inner wall, but rather were of the type that have been used in a real drilling situation for a while. This choice of drill pipes is more realistic and makes the measured results more representative of real situations. Surface roughness is known to induce extra attenuation. In addition, there are well known methods of designing transceiver antennas that can be used to enhance the communication range. In particular, the excitation polarization was not controlled and that also affects the results.

The experimentally measured attenuation can be compared with the measurements reported in the U.S. Pat. No. 5,831,549, which is 0.0147 dB/ft. The discrepancy can be attributed to the fact that we used a low power commercial off-the-shelf transceiver and a wire antenna. Considerable improvements are believed achievable by increasing the carrier frequency, using a better antenna, and increasing the transmission power. On the other hand, the quality of the inner waveguide surface can affect the wave attenuation and the drill pipes used in our experiments were not chosen for particularly good surface conditions. Taking the two data points and considering possible erosion of the inner wall, we estimate an attenuation of 0.03-0.1 dB/ft for most practical conditions. With such attenuation and a power budget of 160 (using 11 watt of power), a telemetry distance ranging from 1600-5300 ft can be achieved. Note that this is based on the commercially available receiver sensitivity, an area than can be improved.

The use of other transmission techniques such as Ultra Wide Band (UWB) may also be used. Choosing a single carrier frequency may be difficult in an actual system since the material, condition, and ID of drill pipe may not be the same in all rigs. However, UWB has the advantage that it spreads the transmission energy over a wide area of the spectrum and does not rely on the channel response over a single frequency.

Figure 6:
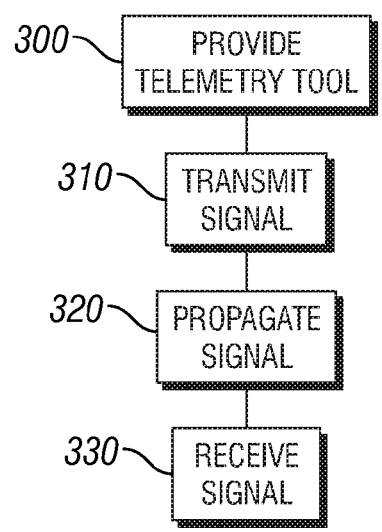
FIG. 6 is a flowchart showing one embodiment of the method described in the present disclosure.

Thus, according to at least the embodiment steps shown in FIG. 6, wireless telemetry may be had by providing a wireless telemetry tool including a waveguide (step 300); transmitting a signal into the waveguide (step 310); propagating the signal in the waveguide (step 320); and receiving the signal (step 330).

Using the drill pipe as a waveguide for communicating with the bottom hole assembly has a number of advantages over current techniques. When mud pulse telemetry is not possible (e.g. air drilled wells), E-Mag™ type telemetry is used. This technique uses the formation as the transmission medium and, to minimize the attenuation, frequencies of a few Hz are used. This yields very low telemetry rates. The presently disclosed method can achieve much higher bit rates and bi-directional communication. The downhole sub is also much simpler and requires much less power to operate. Repeaters will likely have to be used in most applications, but that is expected to have minimal impact.

When drilling wells with oil based mud, the presently disclosed method is a high speed replacement of mud pulse telemetry and wired drill pipe (WDP) systems. The data rates that can be achieved with such a system are comparable or better than WDP. In addition, it does not require any modifications to the drill pipe, yielding a system that is easier to deploy and of much lower cost.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded. While the invention has been described with respect to a limited number of embodiments, those skilled in the art, having benefit of this disclosure, will appreciate that other embodiments can be envisioned that do not depart from the scope of the invention as disclosed herein.

What is claimed is:

1. A telemetry tool for use in a well, comprising:
a cylindrical conductive waveguide for providing two-way communication of data and having an interior wherein the cylindrical conductive waveguide comprises drill pipe;
a non-conductive fluid within the interior of the waveguide wherein the non-conductive fluid is oil based mud or air;
a receiver disposed in the interior of the waveguide;
a system for determining a cutoff frequency; and
a transmitter disposed in the interior of the waveguide some distance from the receiver;
the transmitter transmitting a microwave signal into the interior of the waveguide and using the drill pipe to propagate the microwave signal from the transmitter to the receiver, wherein the waveguide propagates the microwave signal between an uphole wireless interface and a downhole wireless interface and the microwave signal being above the cutoff frequency and having a frequency of 1.0 GHz or greater; and
the cutoff frequency is calculated by using a following relation, $$f_{c,nm} = \frac{Cp'_{nm}}{2\pi a}$$

wherein C is the speed of light, a is the inner radius of the conductive waveguide, modes with magnetic and electric field patterns are characterized by two indices, m and n;
$p'_{nm}$ is the $m^{th}$ root of the equation:

$$\frac{d}{dr}J_n(k_c r) = 0$$

where $J_n(k_c r)$ is the Bessel function of the first kind and $n^{th}$ order, and $k_c$ is given by, $$kc=(2\pi * fc)/C$$

fc is the cutoff frequency for a mode.

2. The telemetry tool of claim 1, wherein the telemetry tool is a while drilling tool.

3. The telemetry tool of claim 1, wherein the waveguide is made of metal.

4. The telemetry tool of claim 1, wherein the receiver is a first transceiver and the transmitter is a second transceiver.

5. The telemetry tool of claim 1, wherein the transmitter and the receiver operate using Ultra Wide Band frequencies.

6. The telemetry tool of claim 1, further comprising repeaters disposed in the interior of the waveguide.

7. A method to telemeter data in a wellbore, comprising:
providing a telemetry tool comprising a cylindrical conductive waveguide for providing two-way communication of the data and the waveguide having an interior; a non-conductive fluid within the interior of the waveguide; a receiver disposed in the interior of the waveguide; and a transmitter disposed in the interior of the waveguide some distance from the receiver wherein the waveguide is drill pipe and the non-conductive fluid is air or oil based mud;
determining a cutoff frequency;
transmitting a microwave signal from the transmitter into the interior of the waveguide;
using the drill pipe to propagate the microwave signal from the transmitter to the receiver; and
receiving the microwave signal with the receiver wherein the drill pipe propagates the microwave signal between an uphole wireless interface and a downhole wireless interface, the microwave signal being greater than the cutoff frequency and having a frequency of 1.0 GHz or greater; and
the cutoff frequency is calculated by using a following relation, $$f_{c,nm} = \frac{Cp'_{nm}}{2\pi a}$$

wherein C is the speed of light, a is the inner radius of the conductive waveguide, modes with magnetic and electric field patterns are characterized by two indices, m and n;

$$\frac{d}{dr}J_n(k_c r) = 0$$

where $J_n(k_c r)$ is the Bessel function of the first kind and $n^{th}$ order, and $k_c$ is given by,
$p'_{nm}$ the $m^{th}$ root of the equation:

$$kc=(2\pi * fc)/C$$

fc is the cutoff frequency for a mode.

8. The method of claim 7, further comprising encoding information on the microwave signal.

9. The method of claim 8, wherein the encoded information is drilling data and/or formation evaluation data.

10. The method of claim 9, further comprising making drilling decisions based on the drilling data and/or the formation evaluation data.

11. The method of claim 7, further comprising sending instructions to the telemetry tool in the wellbore.

12. The method of claim 7, wherein the microwave signal is transmitted using Ultra Wide Band frequencies.

13. The method of claim 7, further comprising using repeaters to increase a transmission range of the microwave signal.

14. The method of claim 7, wherein said determining the cutoff frequency comprises determining a cutoff frequency for each segment of the conductive waveguide.

15. A method to telemeter data while drilling a wellbore, comprising:

provimg a drilling telemetry tool comprising a drill string for providing two-way wireless communication of the data and the drill string having an interior, wherein the drill string is a cylindrical conductive waveguide; an oil based mud within the interior of the drill string; a first transceiver disposed in the interior of the drill string; and a transmitter disposed in the interior of the drill string some distance from the first transceiver;

determining a cutoff frequency;

transmitting a microwave signal from the transmitter into the interior of the drill string;

using the drill string to propagate the microwave signal from the transmitter to the first transceiver, the microwave signal being above the cutoff frequency and having a frequency of 1.0 GHz or greater; and receiving the microwave signal with the first transceiver; and the cutoff frequency is calculated by using a following relation, $$f_{c,nm} = \frac{C p'_{nm}}{2\pi a}$$

wherein C is the speed of light, a is the inner radius of the conductive waveguide, modes with magnetic and electric field patterns are characterized by two indices, m and n; $p'_{nm}$ is the $m^{th}$ root of the equation:

$$\frac{d}{dr} J_n(k_c r) = 0$$

where $J_n(k_c r)$ is the Bessel function of the first kind and $n^{th}$ order, and $k_c$ is given by, $kc = (2n * fc)/C$ fc is the cutoff frequency for a mode.

* * * * *